United States Patent
Kogan et al.

(10) Patent No.: US 10,956,421 B2
(45) Date of Patent: *Mar. 23, 2021

(54) QUERY RESTARTABILITY

(71) Applicant: Google LLC, Mountain View, CA (US)

(72) Inventors: Yevgeniy Kogan, Kirkland, WA (US);
Rajesh Rao, Clyde Hill, WA (US);
Sergey Melnik, Kirkland, WA (US)

(73) Assignee: Google LLC

( * ) Notice: Subject to any disclaimer, the term of this patent is extended or adjusted under 35 U.S.C. 154(b) by 139 days.

This patent is subject to a terminal disclaimer.

(21) Appl. No.: 16/235,123

(22) Filed: Dec. 28, 2018

(65) Prior Publication Data

US 2019/0155808 A1    May 23, 2019

Related U.S. Application Data

(63) Continuation of application No. 15/264,797, filed on Sep. 14, 2016, now Pat. No. 10,169,415.

(51) Int. Cl.
| | | |
|---|---|---|
| *G06F 7/00* | (2006.01) | |
| *G06F 16/00* | (2019.01) | |
| *G06F 16/2455* | (2019.01) | |
| *G06F 16/2453* | (2019.01) | |
| *G06F 16/245* | (2019.01) | |

(52) U.S. Cl.
CPC ........ *G06F 16/2455* (2019.01); *G06F 16/245* (2019.01); *G06F 16/24535* (2019.01)

(58) Field of Classification Search
None
See application file for complete search history.

(56) References Cited

U.S. PATENT DOCUMENTS

| | | |
|---|---|---|
| 4,751,702 A | 6/1988 | Beier et al. |
| 6,253,212 B1 | 6/2001 | Loaiza et al. |

(Continued)

OTHER PUBLICATIONS

"MapReduce," Wikipedia, the free encyclopdedia, last modified on Apr. 13, 2016 [retrieved on Apr. 13, 2016]. Retrieved from the Internet: URL<https://en.wikipedia.org/wiki/MapReduce>, 11 pages.

(Continued)

*Primary Examiner* — Tuan A Pham
(74) *Attorney, Agent, or Firm* — Honigman LLP; Brett A. Krueger

(57) ABSTRACT

Methods, systems, and apparatus, including computer programs encoded on computer storage media, for restarting a query using a token. One of the methods includes receiving, by a computer from a requesting device, a query; determining, using a data storage system, a current result responsive to the query; generating, using the current result, a restart token that represents operations performed to determine a plurality of results responsive to the query including the current result responsive to the query and that can be used to determine a new result responsive to the query that was not included in the plurality of results responsive to the query; and providing, to the requesting device, a message that includes a) first data for the restart token that represents operations performed to determine the plurality of results responsive to the query and b) second data for the current result responsive to the query.

6 Claims, 3 Drawing Sheets

(56) References Cited

U.S. PATENT DOCUMENTS

| | | | |
|---|---|---|---|
| 6,289,474 | B1 | 9/2001 | Beckerle |
| 6,351,754 | B1 | 2/2002 | Bridge, Jr. et al. |
| 7,490,110 | B2 | 2/2009 | Ewen et al. |
| 7,634,687 | B2 | 12/2009 | Haselden et al. |
| 7,725,470 | B2 | 5/2010 | Richards et al. |
| 7,984,043 | B1 | 7/2011 | Waas |
| 7,991,744 | B2 | 8/2011 | Saha et al. |
| 8,489,647 | B2 * | 7/2013 | Briggs .................. G06F 16/284 707/802 |
| 8,572,051 | B1 * | 10/2013 | Chen ................. G06F 16/24532 707/687 |
| 8,600,952 | B2 | 12/2013 | Blitzer et al. |
| 8,738,598 | B2 | 5/2014 | Walters et al. |
| 9,148,329 | B1 * | 9/2015 | Gay ....................... G06F 16/951 |
| 9,183,255 | B1 | 11/2015 | Brown et al. |
| 2007/0185922 | A1 | 8/2007 | Kapoor et al. |
| 2009/0083238 | A1 * | 3/2009 | Chaudhuri ........ G06F 16/24561 |
| 2012/0072412 | A1 * | 3/2012 | Bestgen ............ G06F 16/24549 707/714 |
| 2012/0304003 | A1 | 11/2012 | Goldstein et al. |
| 2014/0222768 | A1 * | 8/2014 | Rambo ............... G06F 16/2282 707/692 |

OTHER PUBLICATIONS

"Oracle RAC," Wikipedia, the free encyclopedia, last modified on Feb. 17, 2016 [retrieved on Apr. 13, 2016]. Retrieved from the Internet: URL<https://en.wikipedia.org/wiki/Oracle_RAC>, 5 pages.

"Sapnner (database)," Wikipedia, the free encyclopedia, last modified Mar. 15, 2016 [retrieved on Apr. 13, 2016]. Retrieved from the Internet: URL<https://en.wikipedia.org/wiki/Spanner_(database)>, 2 pages.

"SQL Azure," Wikipedia, the free encyclopedia, last modified on Apr. 2, 2015 [retrieved on Apr. 22, 2016]. Retrieved from the Internet: URL<https://en.wikipedia.org/wiki/SQL_Azure>, 2 pages.

Balazinska et al., "Fault-tolerance and high availability in data stream management systems," In Encyclopedia of Database Systems, 2009, 9 pages.

Corbett et al., "Spanner: Google's Globally-Distributed Database," Proceedings of OSDI 2012, pp. 1-14.

IBM, "JPAReaderPattern," IBM.com, Feb. 11, 2016 [retrieved on Apr. 26, 2016]. Retrieved from the Internet: URL<https://www.ibm.com/support/knowledgecenter/SSEQTP_8.5.5/com.ibm.websphere.base.doc/ae/rgrid_btchpttm9.html>, 3 pages.

International Search Report and Written Opinion issued in International Application No. PCT/US2017/047797, dated Oct. 12, 2017, 21 pages.

Melnik et al., "Dremel: Interactive Analysis of WebScale Datasets," Proceedings of the VLDB Endowment, 3(1-2):330-339, Sep. 2010.

Microsoft, "DTC Administration Guide," Microsoft.com, 2016 [retrieved on Apr. 13, 2016]. Retrieved from the Internet: URL<https://msdn.microsoft.com/en-us/library/ms681291.aspx>, 2 pages.

Microsoft, "DTC Developers Guide," Microsoft.com, 2016 [retrieved on Apr. 13, 2016]. Retrieved from the Internet: URL<https://msdn.microsoft.com/en-us/library/ms67938.aspx>, 1 page.

Murat, "Metadata: Spanner: Google's Globally-Distributed Database," Murat Buffalo Blogspot, Jul. 4, 2013 [retrieved on Aug. 30, 2013]. Retrieved from the Internet: URL<http://muratbuffalo.blogspot.com/2013/07/spanner-globally-distributed_4.html>, 5 pages.

Taylor, "Recovery From Node Failure in Distributed Query Processing," Technical Reports (CIS), University of Pennsylvania, Nov. 2008, 25 pages.

Upadhyaya et al. "A latency and fault-tolerance optimizer for online parallel query plans," Proceedings of the 2011 ACM SIGMOD International Conference on Management of data, Jun. 12-16, 2011, 19 pages.

Written Opinion issued in International Application No. PCT/US2017/047797, dated Mar. 8, 2018, 13 pages.

* cited by examiner

QUERY RESTARTABILITY

CROSS-REFERENCE TO RELATED APPLICATIONS

This application is a continuation application of, and claims priority to, U.S. patent application Ser. No. 15/264,797, now U.S. Pat. No. 10,169,415, titled "QUERY RESTARTABILITY," filed on Sep. 14, 2016. The disclosure of the foregoing application is incorporated herein by reference in its entirety for all purposes.

BACKGROUND

A system may receive a query from a device, e.g., a client device. The system may delegate work for the query or a portion of the query to a particular computer, e.g., a server that is included in the system. When the system allows parallel processing, the system may provide messages to multiple computers, in which each message indicates a task for the query, and receive responses from the computers. The system may combine data from the responses to determine data to send to the device.

For instance, each computer may be assigned particular portions of data for a database to manage. These individual portions of the database may be referred to as "tablets" or "shards," and may include a portion of the data from a table or tables in a distributed database. When a device requests an operation on particular data in the distributed database (e.g., reading the particular data or writing the particular data), the shard (or in some cases shards) containing the particular data is identified, and the computer assigned the shard is instructed to perform the requested operation of the data in the shard.

Sometimes a system may generate multiple responses that each include partial results responsive to a query. The system may stream the multiple responses to the device from which the system received the query.

SUMMARY

In some implementations, a system processing a query may generate a restart token for results responsive to the query, e.g., when the results do not include all data in the system responsive to the query. The results may include a batch of results or a single result item, e.g., data for an individual row from a database. The system may create a message that includes both the restart token and the result. The message may include the restart token attached to the result or may include the restart token attached to a last item in a batch of results. The system may provide the message to a client device from which the system received the query.

If a connection between the system and the client device is lost, e.g., due to a network failure, a computer restart, a computer crash, or movement of data from a first computer to a second computer in the system, the client device provides the query and the restart token to the system to cause a computer in the system to continue processing of the query. Similarly, when a connection between two computers in a system is lost, a primary computer may provide a secondary computer the query and the restart token to cause the secondary computer to continue processing the query. The secondary computer may be the same computer that was previously processing the query, a different computer, or both.

The restart token allows the system or the secondary computer to restart processing of a query and determine data for a next result responsive to the query without determining any of the intermediate results that were previously provided to a requesting device, e.g., a client device. For instance, when the system receives the restart token and the query, the system is able to determine which results, including a most recent result sent to the requesting device and for which the restart token was created, have already been sent to the requesting device and the next result to send to the requesting device. When the responsive data is represented by keys, the restart token may include a key for the last data sent to the requesting device or a key for the next data that should be sent to the requesting device.

In some examples, the restart token may be a query parameter that alters the results received by a requesting device by omitting results that the requesting device previously received. For example, a requesting device may request the first five results responsive to a particular query from a computer in a system. After the requesting device receives the first five results, the requesting device may process the five results, e.g., import data from the results into a user interface for presentation. The requesting device may then create a new request for the particular query that includes a restart token that represents the first five results so that the computer does not include the first five results as any additional results received by the requesting device in response to the new request. The parameter that identifies the restart token may be included in a header of the new request, a body of the new request, or another appropriate portion of the new request.

In general, one innovative aspect of the subject matter described in this specification can be embodied in methods that include the actions of receiving, by a computer from a requesting device, a particular query; determining, using a data storage system, a current result responsive to the particular query; generating, using the current result responsive to the particular query, a restart token that represents operations performed to determine a plurality of results responsive to the particular query including the current result responsive to the particular query and that can be used to determine a new result responsive to the particular query that was not included in the plurality of results responsive to the particular query; and providing, to the requesting device, a message that includes a) first data for the restart token that represents operations performed to determine the plurality of results responsive to the particular query and b) second data for the current result responsive to the particular query. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of sending a particular query to a computer; and for each current result in a plurality of results responsive to the particular query: receiving, from the computer, a message that includes a) first data for a current result responsive to the particular query and b) second data for a restart token that represents operations performed to determine the plurality of results currently received by the system including the current result and that can be used to determine a new result responsive to the particular query that was not included in the plurality of results responsive to the particular query. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Generating, using the current result responsive to the particular query, the restart token that represents operations performed to determine the plurality of results responsive to the particular query including the current result responsive to the particular query may include generating, using the current result responsive to the particular query, the restart token that represents operations performed to determine the plurality of results responsive to the particular query including i) the current result responsive to the particular query and ii) one or more prior results responsive to the particular query that were previously provided to the requesting device. Determining, using the data storage system, the current result responsive to the particular query may include determining, using the data storage system, one or more current rows responsive to the particular query. Generating the restart token may include: determining that the one or more current rows responsive to the query stored in the data storage system are sorted by a key; and determining an index for the one or more current rows responsive to the particular query in response to determining that the one or more current rows responsive to the query stored in the data storage system are sorted by a key. Providing, to the requesting device, the message that includes a) the first data for the restart token that represents operations performed to determine the plurality of results responsive to the particular query and b) the second data for the current result responsive to the particular query may include providing, to the requesting device, the message that includes a) the first data for the index for the one or more current rows responsive to the particular query and b) the second data that identifies content of the one or more current rows responsive to the particular query. Determining the index for the one or more current rows responsive to the particular query may include determining an index for a last row in the one or more current rows responsive to the particular query.

In some implementations, determining, using the data storage system, the current result responsive to the particular query may include determining, using the data storage system, one or more current rows responsive to the particular query. Generating the restart token may include: determining that the one or more rows responsive to the query stored in the data storage system are not sorted by a particular key; and identifying multiple deterministic decisions made to determine the one or more current rows responsive to the particular query in response to determining that the one or more rows responsive to the query stored in the data storage system are not sorted by a particular key. The multiple deterministic decisions may allow a system to determine the plurality of results responsive to the query including the current result responsive to the particular query. Providing, to the requesting device, the message that includes a) the first data for the restart token that represents operations performed to determine the plurality of results responsive to the particular query and b) the second data for the current result responsive to the particular query may include providing, to the requesting device, the message that includes a) the first data that identifies each of the multiple deterministic decisions made to determine the one or more current rows responsive to the particular query and b) the second data that identifies content of the one or more current rows responsive to the particular query. The method may include: determining, by the computer, that two or more particular operations for generation of results to the particular query may be performed in parallel; generating, for at least two of the two or more particular operations, a respective sub-query; and assigning, for each of the sub-queries, the respective sub-query to an iterator that will perform the respective particular operation to cause two or more of the iterators to process respective sub-queries in parallel. Determining that the one or more rows responsive to the query stored in the data storage system are not sorted by a particular key may include determining that two or more of the iterators are processing respective sub-queries in parallel.

In some implementations, generating the restart token may include generating the restart token without storing the restart token in persistent storage. Generating the restart token may include storing the restart token in a volatile memory without storing the restart token in a non-volatile memory. The method may include: receiving, from the requesting device, the particular query and the restart token that represents operations performed to determine the plurality of results responsive to the particular query and that can be used to determine a new result responsive to the particular query that was not included in the plurality of results responsive to the particular query after providing the message to the requesting device; determining, using a second data storage system and the restart token, a second result responsive to the particular query that was not included in the plurality of results responsive to the particular query; determining a second restart token that represents the operations performed to determine the second result responsive to the particular query and the plurality of results responsive to the particular query; and providing, to the requesting device, a second message that includes a) third data for the second restart token that represents the operations performed to determine the second result responsive to the particular query and the plurality of results responsive to the particular query and b) fourth data for the second result responsive to the particular query.

In some implementations, receiving, from the computer, the message that includes a) the first data for the current result responsive to the particular query and b) the second data for the restart token that represents operations performed to determine the plurality of results currently received by the system including the current result may include receiving, from the computer, the message that includes a) the first data for the current result responsive to the particular query and b) the second data that identifies a particular state of the computer to determine the plurality of results currently received by the system. The second data may include an index that identifies the plurality of results currently received by the system. The second data may include second data that identifies one or more deterministic steps performed by the computer to determine the plurality of results currently received by the system.

In some implementations, sending the particular query to the computer may include sending, across a connection, the particular query to the computer. The method may include: determining, after receiving the message for each of the plurality of results responsive to the particular query, a most recent restart token received from the computer that can be used to determine a new result responsive to the particular query that was not included in the plurality of results responsive to the particular query; providing the particular query and the most recent restart token to a second computer; and receiving, from the second computer, a message that includes third data for a second result responsive to the particular query that was not included in the plurality of results responsive to the particular query and fourth data for a second restart token that represents operations performed to determine the second result responsive to the particular query and the plurality of results. The method may include: determining, after receiving the message for each of the plurality of results responsive to the particular query, that a connection with the computer no longer exists. Determining the most recent restart token received from the computer may be responsive to determining that the connection with the computer no longer exists. The method may include: determining, after receiving the message for each of the plurality of results responsive to the particular query, to request additional results for the particular query from the computer. Determining the most recent restart token received from the computer may be responsive to determining to request additional results for the particular query.

In some implementations, the method may include: receiving, from a requesting device, the particular query prior to sending the particular query to the computer. Sending the particular query to the computer may include sending a first subquery that represents a first portion of operations for the particular query to the computer in response to receiving the particular query from the requesting device; sending a second subquery that represents a second portion of operations for the particular query to a second computer; for each second current result in a second plurality of results responsive to the particular query: receiving, from the second computer, a second message that includes third data for a second current result responsive to the particular query and fourth data for a second restart token that represents operations performed, using the second subquery, to determine the second plurality of results currently received by the system including the second current result; determining a most recent current result and a most recent second current result; and sending, to the requesting device, a response that identifies i) the most recent current result and a corresponding restart token and ii) the most recent second current result and a corresponding second restart token. The method may include: determining to assign the second subquery that represents the second portion of operations for the particular query to the second computer; and prior to sending the second subquery that represents the second portion of operations for the particular query to the second computer: determining that no second current result has been received from the second computer; determining that a current result and a corresponding restart token have been received from the computer; and sending, to the requesting device, a first response that identifies the current result and the corresponding restart token. Sending the second subquery that represents the second portion of operations for the particular query to the second computer may occur after sending, to the requesting device, the first response that identifies the current result and the corresponding restart token. In some implementations, a system may include the computer. The system may include the second computer.

The subject matter described in this specification can be implemented in particular embodiments and may result in one or more of the following advantages. In some implementations, a system may include state information for a query in a restart token to reduce or eliminate storage of state information in a log, to maintain a small restart state, or both. In some implementations, a system that uses restart tokens may be scalable, e.g., without requiring storage space to store restart information. For instance, the system may use a restart token without storing restart information in a persistent storage. In some implementations, a system that uses restart tokens may minimize an amount of work redone after a lost connection, reduce or eliminate delivery of duplicate information to a requesting system, or both. In some implementations, the systems and methods described below may reduce latency for query restarts, may enable query restarts for systems that deliver low latency, may allow queries that run for longer periods of time, allow a requesting system without a paging system to restart a query without receiving duplicate results, decrease a number of transaction aborts due to transient errors, or a combination of two or more of these. For instance, a query restart token, e.g., a low latency query restart token, may help minimize tail latency, e.g., caused by the need to rerun the query on failure, may simplify a programming model by removing the need for retry loop in code, e.g., client code, or both. The simplified programming model may be for read-only transactions that do not take locks, e.g., such as transactions using snapshot isolation. In some examples, a query restart token may enable processing for a query on a system when a probability of failing without restarts is high, e.g., when the probability of failing exceeds a threshold probability, nears one hundred percent, or both. In some implementations, a system or method that uses a query restart token may be able to process a single long running query, e.g., without requiring the use of multiple queries each of which is for a chunk of results responsive to the single query, without analysis of data responsive to each of the multiple queries for consistency, or both.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION 1.0 Overview

Figure 1:
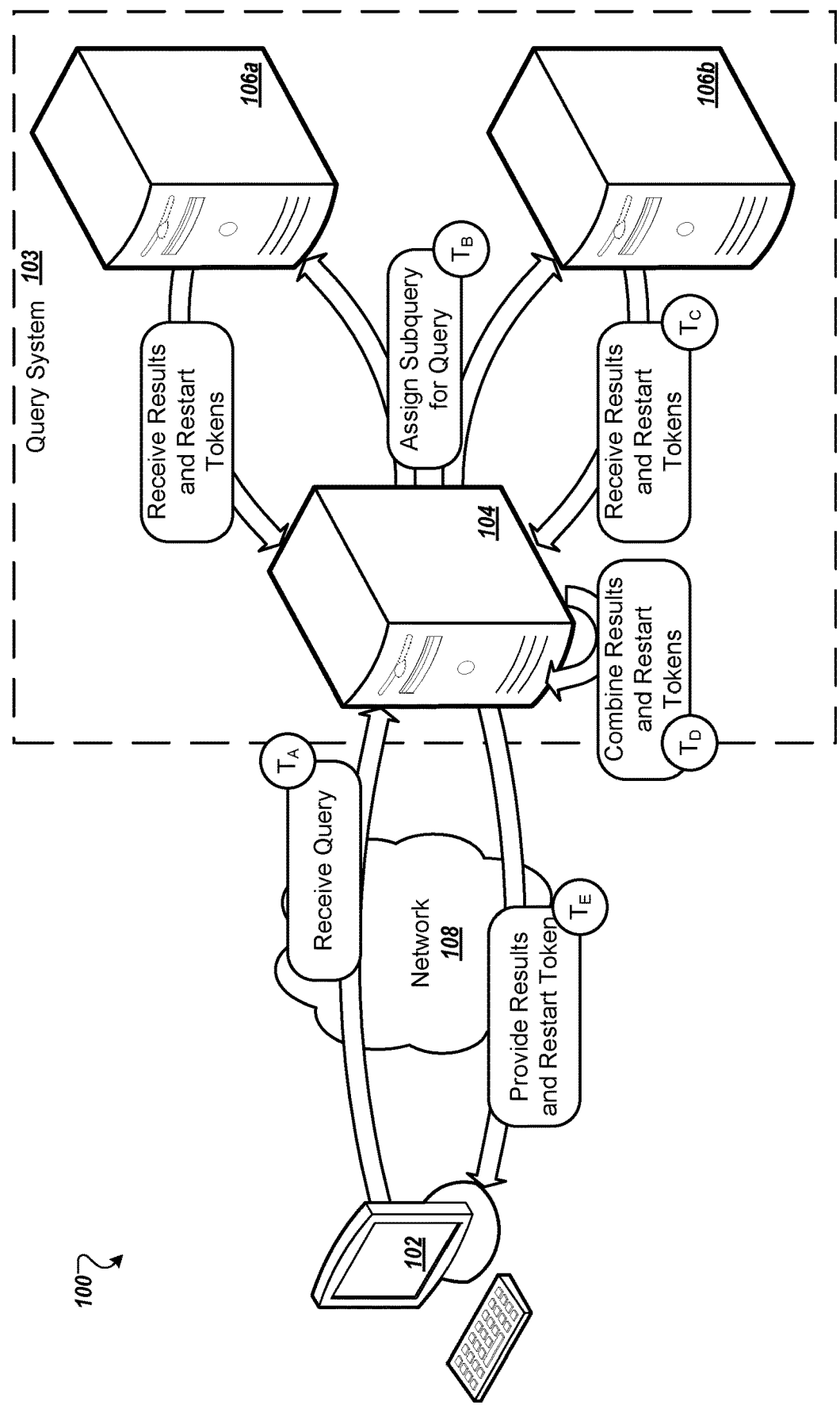
FIG. 1 is an example of an environment in which computers include restart tokens with query results batches.

In some implementations, the systems and methods described below store data that represent a forward progress of work on a query in a restart token and stream a query restart token with each result for a query. The result is one of multiple results each of which are responsive to the query and included in a separate message to a requesting device. The result may be included in a batch of partial results that are each responsive to the query, e.g., in a batch of two or more results, or as an individual result that is part of a stream of results provided to a requesting device. The examples described below generally refer to a batch of results. The same systems and methods may be used for a single result that is a partial result for a query. The system may include one restart token for each message that includes at least one results, e.g., a single result or a batch of results.

A system may generate a restart state for every batch of results and provide the restart state, as a restart token, in a message with data representing the batch of results. When the system experiences a failure and loses state information for the query, the system uses the restart state, e.g., from the most recent batch of results that is received from a requesting device to continue streaming results after the failure.

For example, a system may add a restart token to every batch of results sent to a requesting device. The batches of results may be for partial queries when a search operation for the query is broken into parts and each part of the search operation is worked on as a separate subquery. The system may break the search operation into parts based on shards that include data responsive to the query such that each subquery is for a particular shard. The system provides, for each batch of results, a corresponding restart token with the data for the respective batch of results to the requesting device from which the system received the query, e.g., whether the query is the original query or a subquery.

When the system is no longer receiving data responsive to a query and requires additional responsive data, the system uses a query restart token from a batch of results to continue work on the query. The system may no longer receive data responsive to the query because the system requested only a particular number of results or because the system experiences a broken connection, e.g., between the system and the requesting device or between multiple computers included in the system. For example, when a connection between a first computer in the system and the requesting device is broken, a second computer in the system receives a request from the requesting device for the query that includes the restart token from a batch of results the system previously provided to the requesting device, e.g., the most recent batch of results, to cause the system to continue work on the query. When a connection between two computers included in the system is broken, e.g., when a first one of the two computers is a primary computer that delegates work to a secondary computer that retrieves partial results for the query, the primary computer may use a restart token received from the secondary computer with a batch of results to cause the secondary computer or another computer in the system to continue to generate results for the query. The break in the connection may be caused by a network failure, a computer restart, a computer crash, movement of data from a computer to another computer, or a combination of two or more of these.

In some examples, a computer that was processing the query may stop processing the query because data responsive to the query has been moved to another computer, the data is corrupted, or the computer is overloaded. The computer may be able to stop processing the query when the data responsive to the query is replicated across multiple computers. For instance, the computer may initially host a shard replica that includes data responsive to the query. When the computer determines that the shard replica was moved to a different computer and that the computer no longer has access to the shard replica, the computer stops processing the query. The computer may provide the requesting device with a message that indicates that the computer is no longer processing the query. In some implementations, the computer does not provide the requesting device with a message that indicates that the computer is no longer processing the query.

When a system, e.g., a single computer or multiple computers, determines batches of results responsive to a query, the system may generate a restart token by capturing a state of runtime structures, e.g., stateful runtime structures, executing the query after the system produced a last row in a result batch. The system's runtime structures, e.g., runtime state, may include multiple states of iterators organized into an iterator tree, e.g., of arbitrary size or depth or both.

The iterator tree may represent a runtime query plan for processing a query. Each of the nodes in the iterator tree may represent a single iterator that processes a portion of operations for the query, e.g., a subquery of the query. A computer may perform the portion of the operations for the query represented by an iterator in the iterator tree. An iterator may have zero, one, or more input values. Each of the input values may be a tuple. An iterator may have one output, e.g., an output tuple. The output tuple may represent a result for a query, e.g., as part of a batch of results or a single result.

In some examples, the system may transform a query request into an iterator tree during query compilation and use a state of the iterator tree to generate a restart token. The shape of the iterator tree and the particular data being processed may control the order in which the system provides control to the iterators in the iterator tree.

The system may use the iterator tree to generate a restart token. For instance, the system may use the state of all iterators that participated in producing a last row in a particular result batch to generate the restart token for the particular result batch. The system may use a depth first traversal of the iterator tree to determine data for the restart token. For example, the system may determine a first iterator node in each branch that includes state information and use the determined state information to generate a restart token.

In some implementations, the system may generate a restart token using an order in which the iterators performed operations. For instance, the system may have the iterators produce state information, for a particular result batch, in the same order the iterators produced data for the particular result batch. The system combines the state information in the order the iterators produce the state information when generating a restart token, e.g., so that later use of a restart token to replay steps performed to generate the particular result batch are performed in the same order.

When a system uses a restart token to restart work on a query, e.g., the same computer that initially generated results for the query or a different computer in the system, the system generates an iterator tree and provides the iterators in the iterator tree their restart state from the restart token. The system may provide the iterators their restart state only when the iterators get control to generate data. For instance, the system provides a requesting device a batch of results responsive to a particular query with a particular restart token. The system stops processing the query, e.g., the system experiences a drive failure and crashes or otherwise stops processing the query. The system, e.g., a different computer or the same computer, receives the particular query and the particular restart token from the requesting device and generates an iterator tree for the particular query.

The system uses data from the particular restart token to update state information for the iterators in the iterator tree.

When a current iterator uses data from its restart state, the system may cause the iterator to put the same values as before the restart, e.g., when creating the rows for generating additional result batches. For instance, the restart token may cause the current iterator to see the same input values the current iterator saw before restart.

In some examples, a system may receive, from each of the current iterators for the last row in a particular result batch, variables describing a state of the corresponding iterator. The variables might not include data from the results batch.

The state for each of the current iterators may be less than a few bytes. For example, the state for all of the current iterators may be tens of bytes to allow the system to create a restart token that is tens of bytes, e.g., less than one hundred bytes.

In some implementations, the data accessed by the system is deterministic data. As used in this description, deterministic data are data a system determines in a particular order given a particular query such that the system will determine the same deterministic data in the particular order anytime the system receives the particular query. For instance, given the particular query, the system determines that the deterministic data responsive to the particular query is sorted by a particular key. In some examples, the data may be sorted by a row number, a data identifier, or another appropriate value. In these implementations, a restart token may include the particular key for the last data included in a results batch. A restart token may include the particular key for the next data to include in a new results batch.

In some implementations, a system may determine deterministic data by always performing the same sequences of operations to identify data responsive to a particular query, e.g., when no other operations are available to determine the deterministic data. In some implementations, a system may determine deterministic data by performing a sequence of operations in sequence to determine the deterministic data.

In some examples, the system may determine deterministic data responsive to a particular query that includes more data responsive to the particular query than previously identified, e.g., based on new data added to a database. A subset of the deterministic data that was previously identified will be in the same order as previously identified and will be identified by the system prior to a different subset of the deterministic data that was not previously identified, e.g., the new data will have identifiers sequentially after identifiers for the old data.

In some implementations, the data accessed by the system is non-deterministic data. As used in this description, non-deterministic data is data a system may determine in one of multiple different orders given a particular query depending on a sequence of operations, e.g., non-deterministic steps, performed by the system when determining the non-deterministic data. In some examples, a system may determine non-deterministic data when performing one or more operations in parallel to determine the non-deterministic data. For instance, when a system breaks a search operation for a particular query into parts, e.g., subqueries, assigns each subquery to a particular computer in a group of computers, and has multiple computers from the group of computers performing operations for their corresponding subquery, the system may generate non-deterministic data.

When a system performs non-deterministic steps to determine results responsive to a query, e.g., when results are not sorted by a particular key, the system may include history data in a restart token. The history data may include data representing deterministic steps taken to identify the results responsive to the query. The system may use the history data, upon restart, to determine the steps taken to identify the data previously provided to a requesting device, e.g., to ensure that only data not previously sent to the requesting device is provided to the requesting device upon restart.

2.0 Example Operating Environment

FIG. 1 is an example of an environment 100 in which a query system 103 includes restart tokens with query results batches. For instance, a client device 102, e.g., as a requesting device, in the environment 100 may send, during time period $T_A$, a query to a computer 104 in the query system 103 that requests data. In response, the client device 102 receives, during time period $T_E$, a response that includes partial results responsive to the query and a restart token from the computer 104. The client device 102 may later use the restart token to request additional results responsive to the query, e.g., if the client device 102 becomes disconnected from the computer 104 or otherwise does not receive additional results from the computer 104.

For example, the computer 104 may receive the query during time period $T_A$. When the computer determines batches of results responsive to the query without receipt of data from other computers, the computer determines a first results batch and a corresponding first restart token for the first results batch. The first restart token may represent a state of the computer 104, e.g., one or more iterators on the computer 104, used to determine the first results batch.

During time period $T_E$, the computer 104 provides the first results batch and the first restart token to the client device 102. The computer 104 may include the first results batch in a message with the first restart token. The computer 104 may send multiple packets of data to the client device 102 that represent the message with the first results batch and the first restart token. The computer 104 may send a single packet of data to the client device 102 that represents the message with the first results batch and the first restart token.

The computer 104 may include a database, e.g., a data storage system or a portion of a database such as a shard, with multiple results responsive to the query. The computer 104 may use any appropriate technology to implement the database. The computer 104 queries the database to determine batches of results responsive to the query received from the client device 102. For example, the computer 104 may use a first query to determine a first batch of results, a second query to determine a second batch of results, and so on. The computer 104 may generate the first query and the second query as subqueries for the query received from the client device 102.

The computer 104 may provide multiple batches of results to the client device 102 so that the client device 102 can begin processing data included in each of the results batches as results are determined. For instance, the computer 104 may be part of a search system that provides search results responsive to a query. The computer 104 may provide batches of results, e.g., specific to a particular query, to the client device 102 to cause the client device 102 to present some of the search results in a search results user interface, e.g., after possibly enriching the search results with data obtained from another system. The client device 102 may build a first search results page as the client device 102 receives the batches of results from the computer 104. When the client device 102 receives another batch of results, the client device 102 may add content to the first search results page, buffer results from the other batch of results for generation of a second search results page, e.g., without needing to send multiple requests to the computer 104, or both. The client device 102 may buffer results for the second search results page without determining how to make data in the second search results page consistent with the first search results page, e.g., because the results are responsive to the same query.

When the computer 104 is a primary computer that assigns subqueries to multiple secondary computers 106a-b, the computer 104, e.g., as a requesting device, may assign, during time period $T_B$, a subquery to each of the secondary computers 106a-b. For instance, the computer 104 may determine multiple shards of data that include data responsive to the query. The computer 104 may determine that each of the secondary computers 106a-b stores one of the determined shards. The computer 104 determines a subquery for each of the respective shard and sends the subquery to the corresponding secondary computer 106a-b, e.g., in a message.

The secondary computers 106a-b each perform one or more operations while processing the respective subquery to determine a batch of data responsive to the query. The secondary computers 106a-b each determine a corresponding state of the respective secondary computer used to generate the data in the batch of data and include data for the state in a respective restart token. For instance, a first secondary computer 106a may use an iterator to determine a first batch of data responsive to the query. The first secondary computer 106a may use a state of the iterator as a restart token or part of a restart token. The first secondary computer 106a may use state information for any appropriate number of iterators to determine the restart token.

During time period $T_C$, the computer 104 receives batches of results and corresponding restart tokens from the secondary computers 106a-b. For instance, the computer 104 may receive a message from each of the secondary computers 106a-b, sent in one or more packets, that includes data for the batch of results and data for the corresponding restart token for the particular secondary computer 106a-b.

The computer 104, during time period $T_D$, combines the batches of results and the restart tokens. For instance, the computer 104 may concatenate data representing each of the batches of results from the secondary computers 106a-b together. The computer 104 may store, in memory, a global iterator tree that represents the restart tokens for the secondary computers 106a-b. Each of the local iterator nodes in the global tree may store a restart token for one of the secondary computers 106a-b. The computer 104 may use the global tree to generate a global restart token for the batches of results currently stored on the computer 104 and which have not been sent to the client device 102, e.g., the combined batches of results received from the secondary computers 106a-b.

The computer 104, during time period $T_E$, provides the combined batches of results and the combined restart tokens to the client device 102. For instance, the computer 104 sends a message to the client device 102 that includes data representing the concatenated batches of results and data for the global restart token.

In some examples, the computer 104 may generate a global restart token that includes state information for one or more batches of results previously sent to the client device 102 and for which data will not be sent to the client device 102 during time period $T_E$. For instance, the computer 104 may assign subqueries to three secondary computers (not shown). The computer 104 may receive, from each of the three secondary computers, corresponding first results batches and first restart tokens. The computer 104 provides a first global results batch, which represents the first results batches from the three secondary computers, and a first global restart token, that represents the first restart tokens, to the client device 102, e.g., during time period $T_0$. The computer 104 receives second results batches from a first secondary computer and a second secondary computer and corresponding restart tokens, e.g., during time period $T_1$ after time period $T_0$. The computer does not receive a second results batch from the third secondary computer, e.g., the third secondary computer was restarted and no longer working on the subquery previously assigned to the third secondary computer.

The computer 104 determines that the third secondary computer will not provide a second results batch and generates, using the two second results batches from the first and second secondary computers, a second global results batch. The computer 104 generates a second global restart token using the second restart tokens received from the first and second secondary computers and the first restart token received from the third secondary computer. The computer 104 provides, during time period $T_E$, e.g., after time period $T_1$, the second global results batch and the second global restart token to the client device 102, e.g., in a message. The computer 104 may determine that a connection with the third secondary computer was lost, e.g., the third secondary computer crashed or was rebooted. The computer 104 may provide the third secondary computer, or another computer, with the third subquery previously assigned to the third secondary computer along with the first restart token received from the third secondary computer.

The computer 104 continues to provide results batches and corresponding restart tokens to the client device 102 until no additional data responsive to the query is determined. The computer 104 may include, in a final results batch sent to the client device 102, data that indicates that no restart token is included with the final results batch, e.g., that no additional data will be received by the client device 102 for the query.

In some examples, the computer 104 may provide results batches and corresponding restart tokens to the client device 102 until the computer 104 receives a stop request from the client device 102 that indicates that the computer 104 should no longer provide results batches to the client device 102. In some implementations, the computer 104 may provide results batches and corresponding restart tokens to the client device 102 until a predetermined period of time after receipt of the query, until a predetermined number of results batches have been provided to the client device 102, or until another appropriate stop condition is met.

When the client device 102 no longer receives results batches from the computer 104, e.g., based on the stop condition or when a connection between the client device 102 and the computer 104 becomes disconnected, the client device 102 may use a most recently received restart token and the original query to request additional results batches from the computer 104, e.g., so that the client device 102 does not receive any results batches from the computer 104 that the client device 102 previously received.

The time periods $T_A$, $T_B$, $T_C$, $T_D$, and $T_E$ may be any appropriate length. In some examples, one or more of the time periods $T_A$, $T_B$, $T_C$, $T_D$, and $T_E$ may overlap. For instance, the computer 104 may combine the restart tokens and provide a global results batch and a corresponding global restart token, e.g., during time periods $T_D$ and $T_E$, while continuing to receive results batches and corresponding restart tokens from the secondary computers 106a-b, e.g., during time period $T_C$.

In some implementations, a particular global results batch may include multiple results batches from a single secondary computer 106a-b. For instance, the computer 104 may create a global results batch with two results batches from a first secondary computer 106a and one results batch from a second secondary computer 106b.

The client device 102 may be any appropriate device. For example, the client device 102 may include a personal computer, a mobile communication device, or another device that can send and receive data over a network 108. The network 108, such as a local area network (LAN), wide area network (WAN), the Internet, or a combination thereof, connects the client device 102 and the computers in the query system 103. The network 108, or another network, may connect the computer 104 and the secondary computers 106a-b in the query system 103. Although a single computer 104 is described, in some implementations of the environment 100 may use a single computer 104 or multiple computers 104 operating in conjunction with one another, including, for example, a set of remote computers deployed as a cloud computing service.

Each of the computer 104 and the secondary computers 106a-b may be physical computers or virtual computers executing on physical computers. For instance, the computer 104 may be a first virtual machine executing on a physical computer, a first secondary computer 106a may be a second virtual machine executing on a physical computer, and a second secondary computer 106b may be a third virtual machine executing on a physical computer. One or more of the virtual machines may execute on the same physical computer. The computers 104 and 106a-b may be any appropriate combination of physical computers and software executing on physical computers.

In some implementations, one or more of the computers 104 and 106a-b may be a container that executes on an operating system. For instance, a first secondary computer 106a may be a first container that accesses a first shard of data stored in memory of the underlying physical hardware and a second secondary computer 106b may be second container that accesses a second shard of data stored in memory of the underlying physical hardware. The first container and the second container may execute on the same operating system instance, on the same physical computer, or both. In some examples, the first container and the second container may execute on different operating system instances, e.g., of the same operating system type or different operating system types, on different physical computers, or both.

3.0 Example Process Flow

Figure 2:
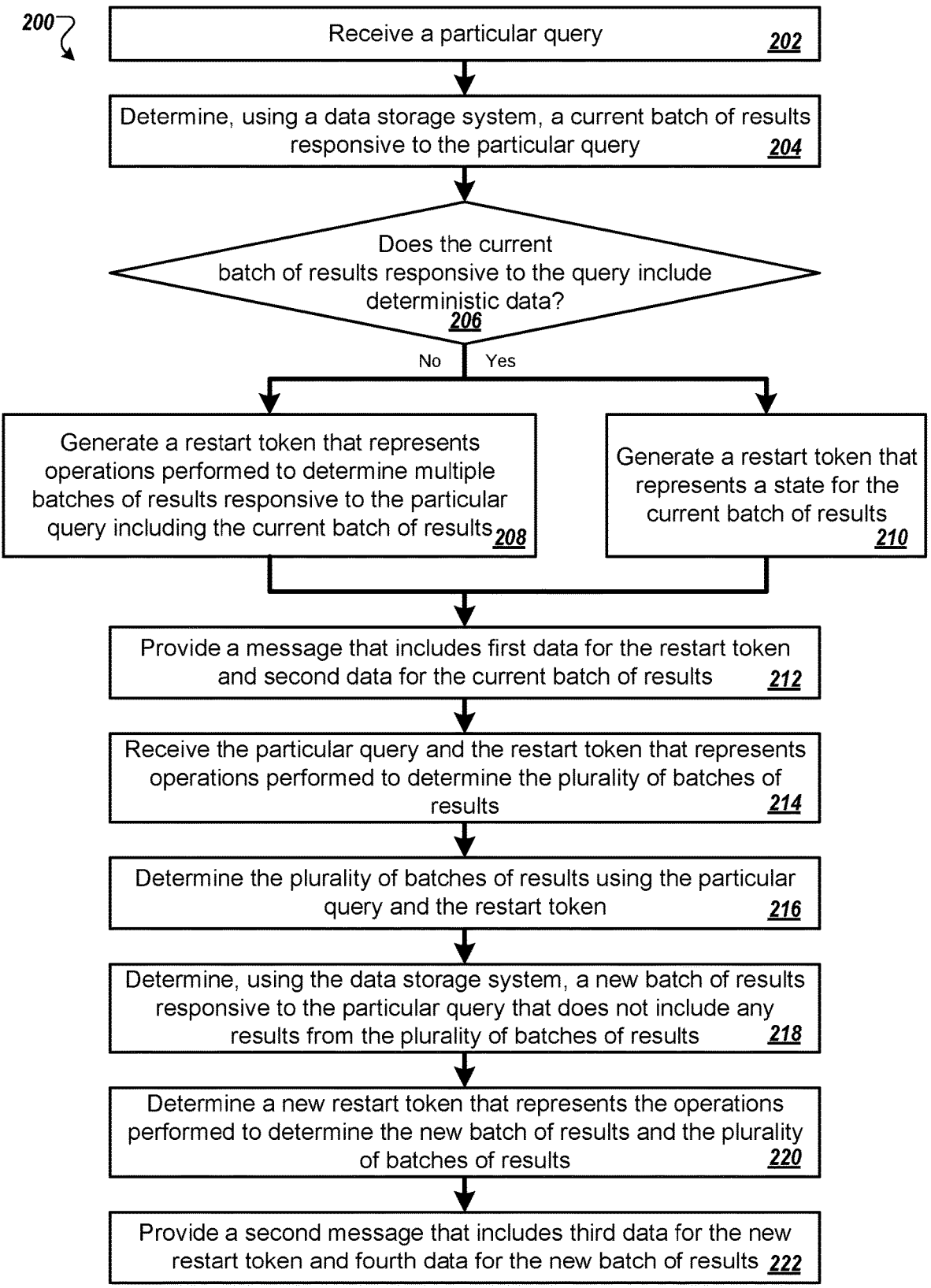
FIG. 2 is a flow diagram of a process for generating a message that includes a results batch responsive to a query and a restart token.

FIG. 2 is a flow diagram of a process 200 for generating a message that includes a results batch responsive to a query and a restart token. For example, the process 200 can be used by the computer 104 or one of the secondary computers 106a-b from the environment 100.

A computer receives a particular query (202). For instance, the computer may receive the particular query from a requesting device. The requesting device may be a primary computer when the computer is a secondary computer, a client device, or another appropriate device. The particular query may be an initial query, e.g., received from a client device, or a subquery, e.g., received from another computer.

The computer determines, using a data storage system, a current batch of results responsive to the particular query (204). The computer may use data from the shards included on the computer, e.g., the shards owned by the computer, to determine the results responsive to the particular query. For example, the computer may include a database that stores data including data responsive to the particular query. The computer may access the database to determine the current batch of results.

The computer determines whether the current batch of results responsive to the query includes deterministic data (206). The computer may determine whether a particular key is used to sort the data, whether multiple computers concurrently process subqueries that identify search operators for the query, e.g., when each of the subqueries is for a shard, whether multiple non-deterministic steps are performed to sort the data, or a combination of two or more of these. When the computer determines that a particular key is used to sort the data, the computer may determine that the current batch of results includes deterministic data. When the computer determines that a particular key is not used to sort the data, the computer may determine that the current batch of results does not include deterministic data.

In response to determining that the current batch of results responsive to the query does not include deterministic data, the computer generates a restart token that represents operations performed to determine multiple batches of results responsive to the particular query including the current batch of results (208). For instance, the computer determines state information that represents the steps performed by the computer to generate the current batch of results. The state information allows the computer, or another computer, to repeat the process, e.g., a sequence of operations performed, used to generate the current batch of results, e.g., so that none of the results in the current batch of results are provided to a requesting device in another batch of results. For instance, if the computer did not receive the state information, the computer may provide results from the current batch of results to the requesting device, e.g., the requesting device may receive some results multiple times. Given that the data is non-deterministic and may be determined in different orders depending on a sequence of operations performed to determine the data, the computer may use the state information to ensure that the sequence of operations is performed in the same order. In some examples, the computer may generate the restart token using the current batch of results, e.g., in addition to the state information.

The computer might not include results in the state information, e.g., to ensure that a size of the restart token is below a maximum threshold size. The computer might not store the state information, e.g., in a permanent memory, to reduce memory requirements, e.g., when the computer would have to store state information for multiple queries, so that the requesting device can restart a query with another computer, e.g., using the restart token, or both.

In response to determining that the current batch of results responsive to the query includes deterministic data, the computer generates a restart token that represents a state for the current batch of results (210). The state may be a state of the computer after determining the current batch of results. The computer or another computer may use the state to determine which results have been provided to a requesting device, which results should next be sent to a requesting device, or both.

The computer provides a message that includes first data for the restart token and second data for the current batch of results (212). The computer may generate the message that includes the first data for the restart token and the second data for the current batch of results. The computer provides the message, using a network, to the requesting device from which the computer received the query. The computer may provide the message using any appropriate method, e.g., as one or more packets.

The computer receives the particular query and the restart token that represents operations performed to determine the plurality of batches of results (214). For instance, when the computer is disconnected from the requesting device, the requesting device may determine that the connection is lost and that no additional results batches have been received from the computer. In response, the computer receives the particular query and the restart token from the requesting device.

The computer determines the plurality of batches of results using the particular query and the restart token (216). For example, whether or not the results batches include deterministic data or non-deterministic data, the computer uses the particular query and the restart token to recreate a state of the computer at a time when the computer provided the last batch of results to the requesting device, e.g., so that the computer does not provide any results to the requesting device which the requesting device already received.

The computer determines, using the data storage system, a new batch of results responsive to the particular query that does not include any results from the plurality of batches of results (218). For instance, the computer accesses the database to determine the new batch of results. The results in the new batch of results do not include any results previously received by the requesting device for the particular query.

In some examples, the database may have different data than previously stored on the computer. For example, when the computer includes a shard of data and the shard later splits, e.g., during the time when the computer was disconnected from the requesting device, the computer determines data included in the remaining portion of the shard that is responsive to the particular query. The computer sends the determined data, as a batch of results, with a corresponding restart token to the requesting device.

In some implementations, when a shard split occurs, the computer may determine, using the particular query and the restart token, that all data responsive to the particular query and stored on the computer has been sent to the requesting device. The computer may generate a message that indicates that all responsive data has been provided to the requesting device. The message may include an indication of the data stored on the computer. The message may include an indication that a shard split occurred.

The computer determines a new restart token that represents the operations performed to determine the new batch of results and the plurality of batches of results (220). For instance, the computer may determine whether the data was determined deterministically or not, e.g., perform step 206. In response, the computer includes the appropriate data in the new restart token. The computer may use the new batch of results to determine the new restart token.

The computer provides a second message that includes third data for the new restart token and fourth data for the new batch of results (222). The computer may generate the second message using the new restart token and the new batch of results. The computer provides the second message to the requesting device.

The order of steps in the process 200 described above is illustrative only, and generating the message that includes the results batch responsive to a query and the restart token can be performed in different orders. For example, the computer can determine whether results are determined deterministically or non-deterministically and then determine a current batch of results. In some examples, the computer may determine whether results are determined deterministically or non-deterministically and determine a current batch of results concurrently.

In some implementations, the process 200 can include additional steps, fewer steps, or some of the steps can be divided into multiple steps. For example, the computer may perform steps 202 through 212 without performing one or more of steps 214 through 222. In some examples, the computer may perform steps 202 through 204 and steps 210 through 212.

4.0 Optional Implementation Details

In some implementations, a system may generate a restart token that does not have a noticeable impact on network cost, processor cost, or both. The system may generate a restart token of any appropriate size. The system may generate a restart token with a size in thousands of bytes, e.g., less than ten thousand bytes, preferably in hundreds of bytes, e.g., less than a thousand bytes, more preferably in tens of bytes, e.g., less than one hundred bytes. For instance, when the system receives state information from each current iterator that is less than a few bytes, a total size of a restart token may be less than three hundred bytes, preferably less than one megabyte.

A system may control a size of a restart token. For instance, the size of a restart token may be based on a query complexity, a degree of parallelism for processing a query, e.g., where each sub-query running in parallel may need separate restart state, or both. The system may adjust the query complexity, the degree of parallelism, or both, to adjust the size of a restart token, e.g., to maintain the size of the restart token below a threshold size. For instance, the system may use a size of an iterator tree that represents a runtime query plan, a shape of the iterator tree, e.g., that represents the degree of parallelism for processing of the query, or both, to determine a size of a restart token. The system may adjust the size of the iterator tree, the shape of the iterator tree, or both, to adjust a size of a corresponding restart token. In some examples, the system may include data for a runtime query plan, represented by an iterator tree, as part of a restart token, e.g., when responsive data is determined non-deterministically. In some examples, the system does not include data for a runtime query plan, represented by an iterator tree, as part of a restart token, e.g., when responsive data is determined deterministically.

In some implementations, a system may allow parallel processing when an order in which results are generated is not important. For instance, the system may determine to generate a sub-query for different operations used to generate results for a query when the requesting device that provided the query to the system indicated that the order in which the results are provided to the requesting device does not matter or the system otherwise determines that the order does not matter. The system may assign sub-queries for different operations to different iterators. Each of the iterators generates results for a corresponding sub-query in parallel.

When multiple computers perform operators to determine result batches responsive to a query, a primary computer, e.g., the computer 104, may generate a global iterator tree, e.g., a runtime query plan, that includes state information from each of the multiple computers. For instance, the primary computer may assign each of the multiple computers, as a node for the global iterator tree, a portion of a distributed query for which the computer will perform work, e.g., the node processes data from one shard of input data. The primary computer may use a particular local iterator to invoke a subquery of the query remotely on one of the computers, e.g., nodes. The primary computer may receive subquery results, including a corresponding restart token, from the one of the computers and provide the results to a local iterator. The local iterator may be part of a global iterator tree stored on the primary computer in which each local iterator corresponds to one of the computers assigned a portion of the distributed query. The primary computer uses the local iterator to update the global tree using the results and included restart token.

The primary computer may generate a global restart token using the global iterator tree. For instance, the primary computer receives multiple subquery results batches, each from one of the computers that is processing a subquery and represents one of the iterator nodes in the global iterator tree. Each of the subquery results batches includes a corresponding restart token. The primary computer may provide the restart tokens to corresponding local iterators in the global iterator tree to cause the local iterators to update the global iterator tree. The primary computer uses the subquery results which have not been provided to a requesting device, from which the primary computer received the original query, to generate a current results batch. The primary computer uses the local iterators for the subquery results included in the current results batch to generate a current restart token. The primary computer sends the current results batch and the current restart token to the requesting device.

In some examples, the primary computer may dynamically adjust a number of local iterators included in a global iterator tree, and a corresponding number of secondary computers performing operations for a query, using a number of shards of input data. For instance, the primary computer may adjust the number of local iterators using a number of computers that are performing work for the distributed query, e.g., in which each computer includes one shard of the input data. When the shards on which data for a query is stored change, e.g., are combined or split, the primary computer updates the local iterators to represent the change in the shards. The primary computer may generate a restart token that includes state information for each shard, e.g., a relevant part of the set of shards may be round-tripped in a restart token for a particular results batch, so that, upon restart, the iterators receive the exact same data the iterators saw before the restart.

When a system dynamically changes how data partitions are grouped into shards on multiple computers during query processing, the system may use multiple stages to generate a restart token. For example, the system may fix a set of shards at a time when the computer gets control of processing for a query. When the system determines that a shard has split after the system has assigned a subquery to a particular computer that previously hosted the shard, the system ensures that the particular computer processes the data in the remaining portion of the shard in order to cause the particular computer to generate a restart state specific to only the remaining portion of the shard and not data previously included in the shard before the split.

For instance, a primary computer may begin by ignoring dynamic sharding and fixing the set of shards at the time the primary computer gets control of the query. The primary computer may set the shards by creating a global iterator tree for the shards, e.g., in which one iterator node in the global iterator tree corresponds to each of the shards. The primary computer assigns, for each iterator node in the global iterator tree, corresponding operations to a secondary computer. As the secondary computers in the system process corresponding subqueries, the system, e.g., the primary computer, may dynamically change shard assignment to different secondary computers in the system, e.g., since the set of shards may become stale as the query processing progresses.

When a logical shard included in the set of shards is split after the primary computer assigns a subquery to the secondary computer hosting the logical shard, the system may restrict the secondary computer to iterate through logical partitions of underlying input data in order, e.g., when performing operators for the subquery, so the reads of physical data on the secondary computer never jump back and forth between data records that can be split between different shards, computers, e.g., nodes, or both.

When a primary computer detects a broken connection with a computer, the primary computer may use a current restart token for the computer to cause the computer, or another computer that hosts the same shard, to continue work on a subquery previously assigned to the computer. When a requesting device detects a broken connection with a primary computer, the requesting device may use a current global restart token to cause the primary computer, or a different primary computer, to continue work on a query.

In some implementations, a primary computer may group shards into an appropriate number of shard groups and allow subquery processing between the shard groups to run in parallel. For instance, the primary computer may receive, from each of the shard groups, corresponding state information that represents results generated for the shards in the corresponding shard group. The primary computer combines the state information from the shard groups to create a global restart token. The primary computer may select the number of shard groups based on a maximum restart token size. In some examples, the primary computer may create between three and twenty shard groups. In some examples, the primary computer may create between five and twelve shard groups. The primary computer may use any appropriate number as the total number of shard groups. The primary computer may determine the number of shard groups using a maximum restart token size, a maximum message size, or both.

The system may cause computers that host the shards in a shard group to process subquery results sequentially. For instance, the primary computer may only assign shards to a shard group that together form a contiguous data set. The primary computer may select a first computer that hosts a first shard in a shard group and send the first computer a first subquery, e.g., for the first shard. While the first computer processes the first subquery, the primary computer receives batches of results from the first computer and corresponding restart tokens with each of the batches of results. The primary computer also receives data from other computers for other shard groups.

When the primary computer determines that the first computer is done processing the first subquery, the primary computer selects a second computer that hosts a second shard in the shard group. The second shard is sequentially after the first shard without any intermediate shards. The primary computer sends a second subquery to the second computer and, in response, receives batches of results with corresponding restart tokens from the second computer.

The primary computer uses the restart token for a current shard in a shard group as the restart token for the shard group. For example, when the first computer is processing the first subquery, the primary computer uses a first restart token from the first computer as the restart token for the shard group to which the first computer belongs. When the second computer is processing the second subquery, after the first computer is done processing the first subquery, the primary computer uses a second restart token from the second computer as the restart token for the shard group to which the first computer and the second computer belong.

In some implementations, when a system generates a restart state in an order in which iterators performed operations, the system may use a minimal set of iterators to produce a restart state. In some implementations, when the system has the iterators generate state information in the same order the iterators produced data for a particular result batch, the system might not propagate a call to generate restart state to a sub-tree of the iterator tree that did not participate in a computation of values in a last row for the particular result batch. In some implementations, a primary computer might not request iterator state information from a computer processing a subquery and instead may use a current restart token received from the computer with a last batch of results.

In some implementations, when a system causes a secondary computer to iterate through logical partitions of data in order after a split of a shard previously hosted on the secondary computer, a primary computer included in the system may be able to associate a logical partition key with each row the primary computer receives from the secondary computer. The primary computer may store the logical partition key in a global restart token for later use during restart. The system may use the logical partition key to allow restart after shard boundaries have changed since the generation of the restart token.

In some implementations, a computer may receive a particular query that includes a stop condition. For instance, the stop condition may specify that the computer should send a particular number of results, a particular number of batches of results, or batches of results for a particular period of time to a requesting device. The computer sends batches of results to the requesting device until the stop condition is met.

The computer may later receive the particular query with a restart token for the last batch of results sent to the requesting device. In response, the computer provides additional batches of results to the requesting device, e.g., until a second stop condition is met or there are no additional results to send to the requesting device.

In some implementations, a system may use multiple different types of restart tokens. For instance, when a system has not started processing input, the system may leave the restart token empty, e.g., and allocate space for the restart token in a memory. The system may allocate space in a volatile memory for the restart token, e.g., without allocating or using space in a non-volatile memory for the restart token. When the system is processing batches of results and still has more results to send to a requesting device, the system may use data that represents a state of the processing of a query as the restart token. The system stores the state, as data for the restart token, in the allocated space in the volatile memory. When the system has finished processing input and determines a final batch of results responsive to a query, the system may use a variable, e.g., which represents infinity or a compact representation of infinity, as the restart token.

The requesting device may use the restart token to determine a status of the query. For instance, the requesting device may analyze the restart token to determine whether there are additional results or batches of results that the requesting device will receive. When the requesting device determines, using the restart token, that there are no additional results or batches of results, the requesting device may use the batches of results received from the computer, stop waiting for additional batches of results, or both.

When the requesting device determines, using the restart token, that there are additional batches of results, the requesting device may use the currently received batches of results, determine whether a batch of results has not been received within a predetermined period of time, or both. For instance, the requesting device may cause a presentation of data included in some of the batches of results.

If the requesting device determines that a batch of results has not been received from the computer within the predetermined period of time, the requesting device may determine whether a connection with the computer has been lost. In response to determining that the connection with the computer has been lost, the requesting device may create a second connection with the computer or a second connection with another computer. The requesting device uses the second connection to provide the query and the most recent restart token as part of a request for results responsive to the query. The requesting device may provide the query and the most recent restart token to the computer or the other computer.

In some examples, a restart token may indicate a number of rows to skip to determine current input for a current batch of results, e.g., in addition to a state of a system processing a corresponding query. In some examples, a restart token may indicate an input number that identifies an iterator from an iterator tree that yielded a last entry included in a most recent batch of results as a state of a system processing a corresponding query. When the computer receives a restart token it may update its state according to the restart token. The computer may use a restart token to request data from the current input, and skip the given number of rows identified by the restart token.

In some implementations, a system may generate a restart token for an iterator tree using a depth first traversal, e.g., a conditional depth-first traversal. For instance, the system may navigate the nodes in the iterator tree, e.g., for which each node represents an iterator used to process a query, and determines the top most nodes in the iterator tree that include state information. The system generates, using the state information for the top most nodes, the restart token. The system may determine a top most node for each branch of the iterator tree, e.g., when different branches include state information at different levels.

In some examples, the system may determine whether to go to a deeper level of the iterator tree based on whether a child node has a non-empty restart state. The system may use the non-empty restart state to create a restart token for the corresponding branch of the iterator tree. The system may create a restart token for each branch of the iterator tree and combine the restart tokens for each of the branches to create a restart token for the entire iterator tree.

The system may traverse an iterator tree in the same way in which control is passed through the iterators represented by the iterator tree during query execution. For instance, the system may use the iterator tree to determine which portion of operations for a particular query to send to corresponding iterators, e.g., computers. As the system traverse the iterator tree to determine the operations, the system may generate respective restart tokens for the iterators, e.g., for use in generation of a restart token for the entire iterator tree.

In some implementations, a system may include history data with a restart token. For instance, the history data may represent deterministic steps taken to generate results batches. The history data may describe how a system with non-deterministic output can perform particular steps, e.g., deterministic steps, to order data for determining batches of results. For instance, the history data may indicate how the system can replay some number of rows in a given order so that, upon restart, the system or another system will skip only the rows that were previously included in results batches sent to a requesting device and no additional rows.

When a system receives a restart token and history data, the system may use a replay mode that replays all of the steps identified in the history data. Replay mode may be a mode, e.g., a sequential mode or a parallel mode, in which the system pulls input data identified by the history data in the order that the input data is identified in the history data. Once the system completes replay of the history data, the system switches to a normal mode in which it retrieves data and creates results batches. In some examples, when the system performs steps in replay mode sequentially, the system may perform steps in normal mode in parallel, e.g., when the system begins to generate results to provide to a requesting device.

A system may generate history data when iterator behavior depends on both input values or constants and variable values produced outside of the iterator or descendant iterators in an iterator tree. For instance, a system, e.g., a relational query processor, may include an iterator such as "cross apply" or "outer apply" that produces correlation variable values. When the system generates a restart token for an iterator that produces correlation variable values, the system may generate both a restart token and history data that allows replay of the values produced by the system, e.g., by the iterator, before restart occurred, e.g., instead of indicating whether the iterator left off in processing of a query before restart.

When history data includes data that identifies an order in which iterators were called, in which iterators called each other, or both, to produce a last result item, a system may determine whether a restart token, history data, or both, includes data for a particular iterator in an iterator tree. For instance, when restarting a query using a restart token and history data, the system provides history data to the iterators that will continue work previously performed for the query. The system might not provide history data to any iterators that will not continue work previously performed for the query. For example, for a particular iterator that does not have any history data, does not need to deliver results in a repeatable order based on the history data, or both, the system will not provide the particular iterator with a restart token or history data. The system may provide the particular iterator with only a subquery that identifies a search operation for the particular iterator.

In some examples, when a particular iterator will start its children from the beginning, e.g., without history data or a restart token, the particular iterator might not request restart state information from its child iterators when generating a restart token. The restart token may indicate that no work has been performed. In some implementations, when a particular iterator doesn't depend on a repeatable order of input, the particular iterator might not request a restart token from its child iterators. The particular iterator may generate a restart token or a restart token and history data using results the particular iterator has received from its child iterators.

In some implementations, a restart token may include an identifier that indicates whether the restart token includes history data or not. For instance, a restart token may include a history identifier. The history identifier may be a Boolean value that indicates whether the restart token includes history data.

In some implementations, a system may include a history token that includes the history data separate from the restart token. Generally, any system that includes both history data and restart state information with a batch of results may be described as including a restart token with history data irrespective of whether or not the history data and the restart state information are in sequential portions of a message or separated by other data, e.g., headers, responsive data, or other data.

In some implementations, a restart token may include an identifier for data from which a corresponding batch of results was determined. For instance, a system may include an identifier for a database, a shard, a portion of a table, a portion of memory, an iterator, or a combination of two or more of these, in a restart token. The system may use the identifier to determine which steps correspond to which data, batches of results, or subqueries.

In some implementations, a system may generate history data that includes identifiers for data to which the history data applies. For instance, the system may include multiple keys in the history data such that each of the keys indicates the data to which corresponding history data, e.g., steps, apply. When the system includes keys in the history data, the system may use the keys to replay a history after a split. For instance, when a split reduces a boundary of a shard, a system may use a key to determine which steps in a history apply to a particular new shard and perform only those steps during replay.

In some implementations, a system may include multiple levels of secondary computers. For instance, a primary computer may assign subqueries to a first level of secondary computers. Each computer in the first level of secondary computers may assign further subqueries to a second level of secondary computers, such that each first level secondary computer is associated with particular second level secondary computers.

An iterator tree may represent the number of computers that process operations for a query. For instance, each iterator in an iterator tree may represent a computer that processing operations for a query. In some examples, a single computer may perform operations for multiple iterators in the iterator tree, e.g., when the single computer executes a virtual machine for each of two iterators from the iterator tree. The leaf nodes in the iterator tree may represent particular computers that generate results and provide results to computers represented by non-leaf nodes in the iterator tree. The computers represented by the non-leaf nodes in the iterator tree may receive results from multiple other computers, e.g., represented by leaf nodes or non-leaf nodes, and combine the received results. The computers represented by the non-leaf nodes in the iterator tree may communicate with their child iterators to generate a restart token or both a restart token and history data.

In some implementations, a system may use history data when the system includes two or more levels of secondary computers, e.g., and not when a single computer processes a query or a primary computer and one level of secondary computers process operations for a query. In some implementations, a system may use history data when the system includes parallel processing by two or more secondary computers, e.g., irrespective of the level of the secondary computers. In some implementations, a system may use history data when the system includes two or more levels of secondary computers and uses parallel processing by at least some of the secondary computers.

In some implementations, when a system generates results batches in parallel and creates history data for the results batches, the system may determine whether a size of the history data satisfies a threshold size. For instance, the threshold size may be a maximum size and the system may determine whether the size of the history data is greater than or almost greater than the maximum size.

When a size of the history data satisfies the threshold size, the system may stop generating results in parallel and begin generating results sequentially. For instance, the system may determine that this history data is too large and does not satisfy a requirement to maintain a size of a restart token below a threshold size. The system may continue to include the history data as part of a restart token while updating deterministic values within the restart token, e.g., and not increasing the size of the history data. The system may include a processing type identifier in the restart token, e.g., a flag, that indicates that the system switched from parallel processing to sequential processing. The system may include data that indicates when the system switched from parallel processing to sequential processing.

In some implementations, a system may generate history data that identifies steps taken to produce results batches sent to a requesting device, including a current batch of results, e.g., current history data. In some examples, a system may generate history data that identifies steps taken or that will be taken to produce results batches that should be sent to a requesting device, e.g., next history data.

In some implementations, a system may generate different types of history data. For instance, a system may determine whether to use current history data, next history data, or both. The system may create a restart token using the selected type of history data. When a system receives a restart token, the system may determine a type of history data included in the restart token. The system may replay the steps identified in the history data and then determine what steps to perform next based on the type of the history data. When the history data identifies current history data for batches of results sent to the requesting device, the system may determine new results batches to send to the requesting device, e.g., the system may perform additional steps to determine a new results batch. When the history data identifies next history data for batches of results that have not been sent to the requesting device, the system generates a new batch of results, e.g., by selecting results represented by performing the operations indicated in the next history data.

When a system receives a restart token that was generated using both parallel and sequential processing along with a query, the system may initialize a state of the system beginning with the parallel processing. During initialization when the system identifies the value for the processing type identifier that indicates the switch from parallel processing to sequential processing, the system switches from parallel processing of the query to sequential processing of the query.

When processing a query sequentially that may be processed in parallel, a system may determine whether to continue processing a query using sequential processing or whether a size of the history data will be small enough to begin processing data in parallel. For instance, a system may have a current restart token that includes history data. As the system determines additional batches of results, the system may update the history data by removing some of the history data that is no longer needed to determine a current state of the system and determine whether the history data is small enough to allow parallel processing again.

The system may include an iterator interface. The iterator interface may include flow control methods. The flow control methods may include methods to transition an iterator through various stages, to indicate that data responsive to the query is ready, to indicate that there is no additional data responsive to the query, or a combination of two or more of these. For instance, the iterator interface may include signaling mechanism that allows an iterator to indicate that that it has produced all output tuples and the iterator has nothing more to output.

The iterator interface may include data exchange methods. The data exchange methods may include methods that identify locations of input values, output values, or both. A system may determine a state of query execution after determining a final tuple or intermediate tuple using the internal states of iterators in the iterator tree and using values, e.g., output values, accessible with the data exchange methods.

In some implementations, a system may use an iterator tree that indicates separate restart tokens, each for a different subquery of operations generated for a query. The system may assign each of the subqueries to a secondary computer that performs operations to determine results batches for the respective subquery. The system may use, for some of the nodes in the iterator tree, a "begun flag" that indicates whether the corresponding secondary computer has started processing the respective subquery, a "finished flag" that indicates whether the corresponding secondary computer has completed processing the respective subquery, or both. The system may use one or both flags when the system processes subqueries in parallel. The system may use one or both flags when the system processes subqueries sequentially.

When a system determines that a shard split has occurred, the system may generate separate subqueries for each of the splits. For instance, when the split widens a boundary of a shard, a system may create a first subquery for the data originally included in the shard and a second subquery for the data newly added to the shard. The system provides the first subquery and the second subquery to a secondary computer hosting the shard to cause the computer to determine results batches responsive to each of the subqueries and receive the results batches from the secondary computer. For example, when the system has shards {user(user1)/thread(1,10); user(user1)/thread(10,20); user(user1)/thread (20, 30)} and determines that one of the shards changes to user(user1)/thread(15,25); the system may create a first subquery for user(user1)/thread(15,20) and a second subquery for user(user1)/thread(20,25) and provide the first subquery and the second subquery to a computer that hosts the shard user(user1)/thread(15,25), e.g., in different requests.

When a split reduces a boundary of a shard, a system may create new subqueries for the new shard boundaries and include the same restart token for each of the subqueries. The system sends the subqueries to respective secondary computers hosting the respective shards. Each of the secondary computers determines whether the restart token indicates that all data responsive to the subquery has previously been provided to the system. In response to determining that all data responsive to the subquery has previously been provided to the system, the secondary computer provides the system with a message indicating that all data was previously provided to the system. In response to determining that all data responsive to the subquery has not been provided to the system, the secondary computer determines whether the restart token applies to the shard included on the secondary computer. When the restart token applies to the shard included on the secondary computer, the secondary computer determines data not previously provided to the system, using the restart token, and generates results batches using the determined data not previously provided to the system. When the restart token does not apply to the shard included on the secondary computer, the secondary computer ignores the restart token and processes data in the shard as if the secondary computer had not received a restart token.

5.0 Additional Implementation Details

Embodiments of the subject matter and the functional operations described in this specification can be implemented in digital electronic circuitry, in tangibly-embodied computer software or firmware, in a virtual machine, in an application executing on a virtual machine, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, a virtual machine, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a container, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 3:
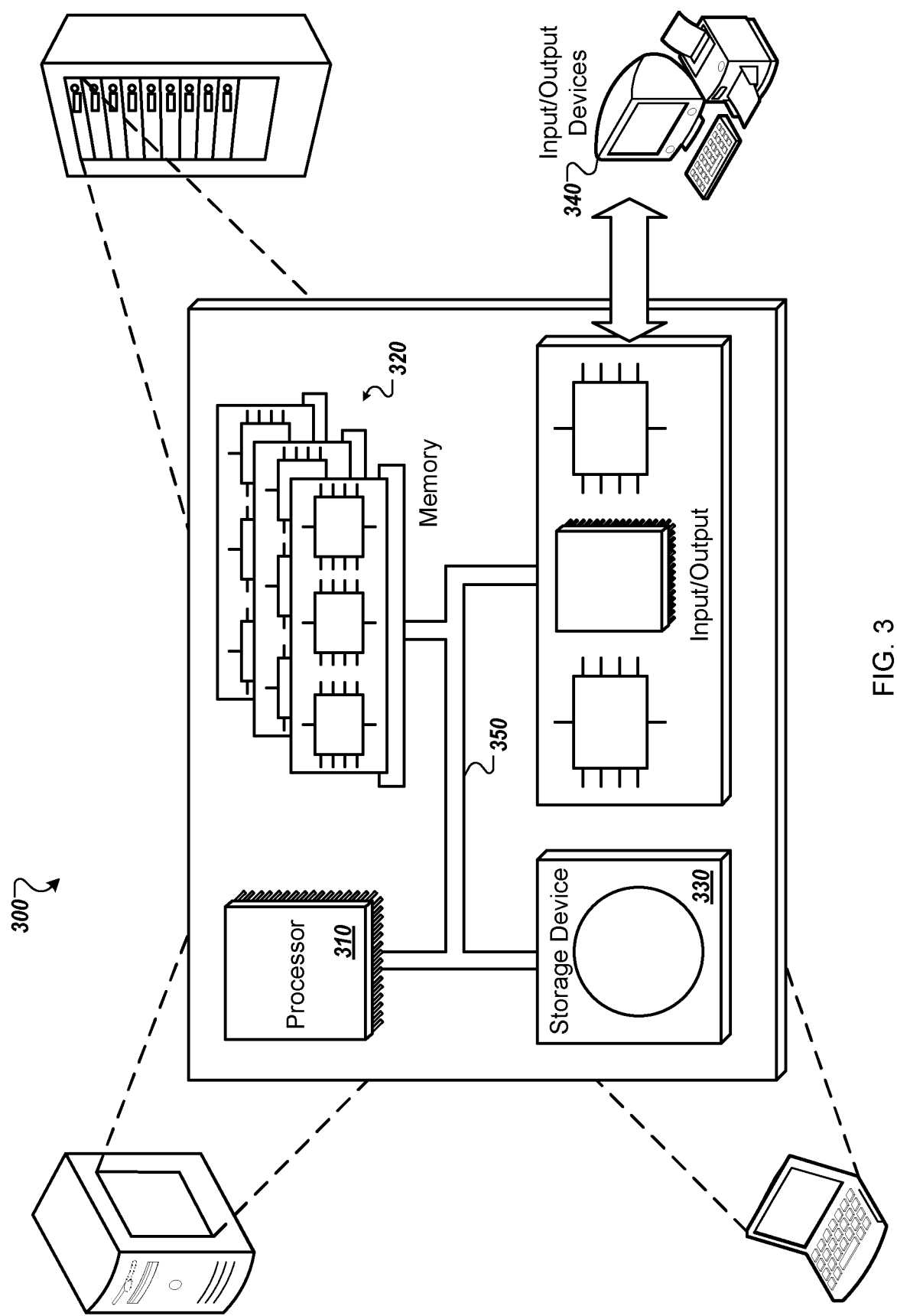
FIG. 3 is a block diagram of a computing system that can be used in connection with computer-implemented methods described in this document.

An example of one such type of computer is shown in FIG. 3, which shows a schematic diagram of a generic computer system 300. The system 300 can be used for the operations described in association with any of the computer-implemented methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving, by a computer from a requesting device, a particular query for data distributed across a data storage system;
   determining, using the data storage system, a current result responsive to the particular query by determining, using the data storage system, a response to the particular query, the response comprising one or more current rows and stored in a data storage system;
   generating, using the current result responsive to the particular query, a restart token that represents operations performed to determine a plurality of results responsive to the particular query and that can be used to determine a new result responsive to the particular query that was not included in the plurality of results responsive to the particular query, the plurality of results including the current result responsive to the particular query, the generating comprising, without storing the restart token in persistent storage:
      determining that the one or more current rows of the response to the particular query stored in the data storage system are sorted by a key; and
      in response to determining that the one or more current rows of the response to the particular query stored in the data storage system are sorted by the key, determining an index for a last row in the one or more current rows of the response to the particular query; and
   providing, to the requesting device, a message that includes a) first data for the restart token that represents operations performed to determine the plurality of results responsive to the particular query, the first data being for the index for the last row in the one or more current rows of the response to the particular query, and b) second data for the current result responsive to the particular query, the second data identifying content of the one or more current rows of the response to the particular query.

2. The method of claim 1, wherein the restart token includes the key.

3. A non-transitory computer readable storage medium storing instructions executable by a data processing apparatus and upon such execution cause the data processing apparatus to perform operations comprising:
   receiving, by a computer from a requesting device, a particular query for data distributed across a data storage system;
   determining, using the data storage system, a current result responsive to the particular query by determining, using the data storage system, a response to the particular query, the response comprising one or more current rows and stored in a data storage system;
   generating, using the current result responsive to the particular query, a restart token that represents operations performed to determine a plurality of results responsive to the particular query and that can be used to determine a new result responsive to the particular query that was not included in the plurality of results responsive to the particular query, the plurality of results including the current result responsive to the particular query, the generating comprising, without storing the restart token in persistent storage:

determining that the one or more current rows of the response to the particular query stored in the data storage system are sorted by a key; and in response to determining that the one or more current rows of the response to the query stored in the data storage system are sorted by a key, determining an index for a last row in the one or more current rows of the response to the particular query; and providing, to the requesting device, a message that includes a) first data for the restart token that represents operations performed to determine the plurality of results responsive to the particular query, the first data being for the index for the last row in the one or more current rows of the response to the particular query, and b) second data for the current result of the response to the particular query, the second data identifying content of the one or more current rows of the response to the particular query.

4. The non-transitory computer readable storage medium of claim 3, wherein the restart token includes the key.

5. A system comprising:

a data processing apparatus; and a non-transitory computer readable storage medium in data communication with the data processing apparatus and storing instructions executable by the data processing apparatus and upon such execution cause the data processing apparatus to perform operations comprising:

receiving, by a computer from a requesting device, a particular query for data distributed across a data storage system;

determining, using a data storage system, a current result responsive to the particular query—by determining, using the data storage system, a response to the particular query, the response comprising one or more current rows responsive to the particular query and stored in a data storage system;

generating, using the current result responsive to the particular query, a restart token that represents operations performed to determine a plurality of results responsive to the particular query and that can be used to determine a new result responsive to the particular query that was not included in the plurality of results responsive to the particular query, the plurality of results including the current result responsive to the particular query, the generating comprising, without storing the restart token in persistent storage:

determining that the one or more current rows of the response to the particular query stored in the data storage system are sorted by a key; and in response to determining that the one or more current rows of the response to the query stored in the data storage system are sorted by a key, determining an index for a last row in the one or more current rows of the response to the particular query; and providing, to the requesting device, a message that includes a) first data for the restart token that represents operations performed to determine the plurality of results responsive to the particular query, the first data being for the index for the last row in the one or more current rows of the response to the particular query, and b) second data for the current result responsive to the particular query, the second data identifying content of the one or more current rows of the response to the particular query.

6. The system of claim 5, wherein the restart token includes the key.

\* \* \* \* \*